US010689818B2

(12) United States Patent
Sherony et al.

(10) Patent No.: US 10,689,818 B2
(45) Date of Patent: Jun. 23, 2020

(54) SURROGATE FOR METAL GUARDRAIL

(71) Applicants: Toyota Motor Engineering & Manufacturing North America, Inc., Plano, TX (US); The Trustees of Indiana University, Indianapolis, IN (US); Ohio State Innovation Foundation, Columbus, OH (US)

(72) Inventors: Rini Sherony, Ann Arbor, MI (US); Stanley Yung-Ping Chien, Zionsville, IN (US); Qiang Yi, Carmel, IN (US); Jun Lin, Carmel, IN (US); Abir Saha, Chicago, IL (US); Yaobin Chen, Carmel, IN (US); Chi-Chih Chen, Dublin, OH (US)

(73) Assignees: Toyota Motor Engineering & Manufacturing North America, Inc., Plano, TX (US); Ohio State Innovation Foundation, Columbus, OH (US); The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 16/144,256

(22) Filed: Sep. 27, 2018

(65) Prior Publication Data
US 2019/0309490 A1 Oct. 10, 2019

Related U.S. Application Data

(60) Provisional application No. 62/655,809, filed on Apr. 10, 2018, provisional application No. 62/655,223, filed on Apr. 9, 2018.

(51) Int. Cl.
*E01F 15/04* (2006.01)
*G08B 21/18* (2006.01)
(Continued)

(52) U.S. Cl.
CPC .......... *E01F 15/0438* (2013.01); *E01F 9/669* (2016.02); *E01F 13/02* (2013.01);
(Continued)

(58) Field of Classification Search
CPC .............. E01F 15/0438; E01F 15/0461; E01F 15/0476; E01F 15/0446; E01F 9/669;
(Continued)

(56) References Cited

U.S. PATENT DOCUMENTS 3,317,189 A * 5/1967 Rubenstein ......... E01F 15/0453
256/13.1
3,591,144 A * 7/1971 Iving ................... E01F 15/0453
404/6

(Continued)

FOREIGN PATENT DOCUMENTS

CN 102087081 A 6/2011
CN 103815604 A 5/2014
(Continued)

OTHER PUBLICATIONS

U.S. Appl. No. 16/144,301, filed Sep. 27, 2018.

*Primary Examiner* — Abigail A Risic
(74) *Attorney, Agent, or Firm* — Christopher G. Darrow; Darrow Mustafa PC

(57) ABSTRACT

Surrogates for roadside objects, such as metal guardrails, can be used for vehicle testing. A surrogate for a metal guardrail can have substantially the same size and/or shape as the metal guardrail that the surrogate is mimicking. The surrogate can be configured to exhibit substantially the same characteristics as their actual counterpart metal guardrail when sensed by one or more vehicle sensors (e.g., cameras, radar sensors, and/or LIDAR sensors). Such surrogates can be used to test autonomous vehicles, one or more vehicle sensors, a vehicle sensor system, and/or one or more vehicle system (e.g., a road departure mitigation system). The surrogates can be configured to withstand being crashed into by a test vehicle without being damaged and without damaging the test vehicle.

20 Claims, 7 Drawing Sheets

(51) Int. Cl.
*E01F 9/669* (2016.01)
*G01S 7/48* (2006.01)
*G01S 17/06* (2006.01)
*E01F 13/02* (2006.01)
*G01S 7/481* (2006.01)
*G01N 21/17* (2006.01)

(52) U.S. Cl.
CPC ...... *E01F 15/0446* (2013.01); *E01F 15/0461* (2013.01); *E01F 15/0476* (2013.01); *G01S 7/4813* (2013.01); *G01S 17/06* (2013.01); *G08B 21/18* (2013.01); *G01N 2021/1793* (2013.01)

(58) Field of Classification Search
CPC ......... E01F 13/12; E01F 15/088; E01F 15/00; E01F 15/086; E01F 15/003
See application file for complete search history.

(56) References Cited

U.S. PATENT DOCUMENTS

| | | | | |
|---|---|---|---|---|
| 3,603,562 A * | 9/1971 | Glaesener | ........... | E01F 15/0407 256/13.1 |
| 3,704,861 A * | 12/1972 | Glaesener | ........... | E01F 15/0453 256/13.1 |
| 3,776,520 A * | 12/1973 | Charles | ............... | E01F 15/0453 256/13.1 |
| 3,963,218 A * | 6/1976 | Glaesener | ........... | E01F 15/0453 256/13.1 |
| 4,000,882 A * | 1/1977 | Penton | .................... | E01F 9/669 256/13.1 |
| 4,222,552 A * | 9/1980 | Matteo, Sr. | ......... | E01F 15/0453 248/345.1 |
| 4,359,737 A | 11/1982 | Bond | | |
| 4,460,161 A * | 7/1984 | Grenga | ................... | E01F 9/669 116/63 R |
| 4,811,516 A * | 3/1989 | Anderson | ............... | E01F 13/06 49/141 |
| 4,982,931 A * | 1/1991 | Pomero | ................... | E01F 15/02 256/13.1 |
| 5,391,016 A * | 2/1995 | Ivey | ...................... | E01F 15/143 256/13.1 |
| 5,429,449 A * | 7/1995 | Baatz | .................. | E01F 15/0453 256/13.1 |
| 6,666,616 B2 * | 12/2003 | Yodock, III | .......... | E01F 15/083 256/13.1 |
| 7,014,389 B1 * | 3/2006 | Siblik | ..................... | E01F 9/669 116/63 P |
| 8,434,965 B2 * | 5/2013 | Chae | ..................... | E01F 15/003 256/13.1 |
| 2006/0011900 A1 * | 1/2006 | Ochoa | ................. | E01F 15/0423 256/13.1 |
| 2007/0187661 A1 * | 8/2007 | Cheng | ................. | E01F 15/0423 256/19 |
| 2007/0199619 A1 * | 8/2007 | Cheng | ................. | E01F 15/0423 144/136.95 |
| 2013/0017015 A1 * | 1/2013 | Chae | ..................... | E01F 15/003 404/6 |

FOREIGN PATENT DOCUMENTS

| | | |
|---|---|---|
| CN | 203597442 U | 5/2014 |
| CN | 108278929 A | 7/2018 |
| DE | 102011006840 A1 | 10/2012 |
| RU | 2495357 C2 | 10/2013 |

* cited by examiner

SURROGATE FOR METAL GUARDRAIL

CROSS-REFERENCE TO RELATED APPLICATIONS

This application claims the benefit of U.S. Provisional Application No. 62/655,809, filed on Apr. 10, 2018, and U.S. Provisional Application No. 62/655,223, filed on Apr. 9, 2018, both of which are incorporated herein by reference in their entirety.

FIELD

The subject matter described herein relates in general to vehicles and, more particularly, to the testing of vehicle systems.

BACKGROUND

When a vehicle departs from a road, the situation can quickly become extremely dangerous. For instance, there are various roadside objects that a vehicle can collide with, and/or the vehicle may be prone to rollover on grass. Some vehicles are equipped with a road departure mitigation system, and it is expected that the use of such systems will increase in the future. A road departure mitigation system can detect when a vehicle is about to leave the road. In such case, the road departure mitigation system can provide a warning to the driver and/or can automatically control one or more vehicle systems (e.g., steering and/or braking) to prevent the vehicle from departing the road.

SUMMARY

In one respect, the subject matter described herein is directed to a metal guardrail surrogate. The metal guardrail surrogate includes a main body. The main body can be configured to be substantially the same size and shape as a main body of a metal guardrail. The main body can include a core, and a skin attached to the core. The core can be a non-metal core. The skin can cover at least a portion of the core. The skin can be configured to exhibit substantially the same characteristics as the main body of the metal guardrail relative to one or more vehicle sensors (e.g., camera(s), radar sensor(s), and/or LIDAR sensor(s)).

In another respect, the subject matter described herein is directed to a metal guardrail surrogate. The metal guardrail surrogate can include a main body, one or more posts operatively connected to the main body, and one or more base elements operatively connected to the posts. The main body can include a core and a skin attached to the core. The skin can cover at least a portion of the core. The skin can be made of a plurality of layers. The main body can be configured to exhibit substantially the same characteristics as a metal guardrail relative to one or more vehicle sensors (e.g., camera(s), radar sensor(s), and/or LIDAR sensor(s)). The one or more posts can support the main body at an elevational position above a surface (e.g., the ground, a road, a shoulder of the road, etc.). The one or more posts can stabilize the metal guardrail surrogate on the surface. The main body, the one or more posts, and the one or more base elements can be separable from each other, such as when impacted by a vehicle.

DETAILED DESCRIPTION

Figure 1:
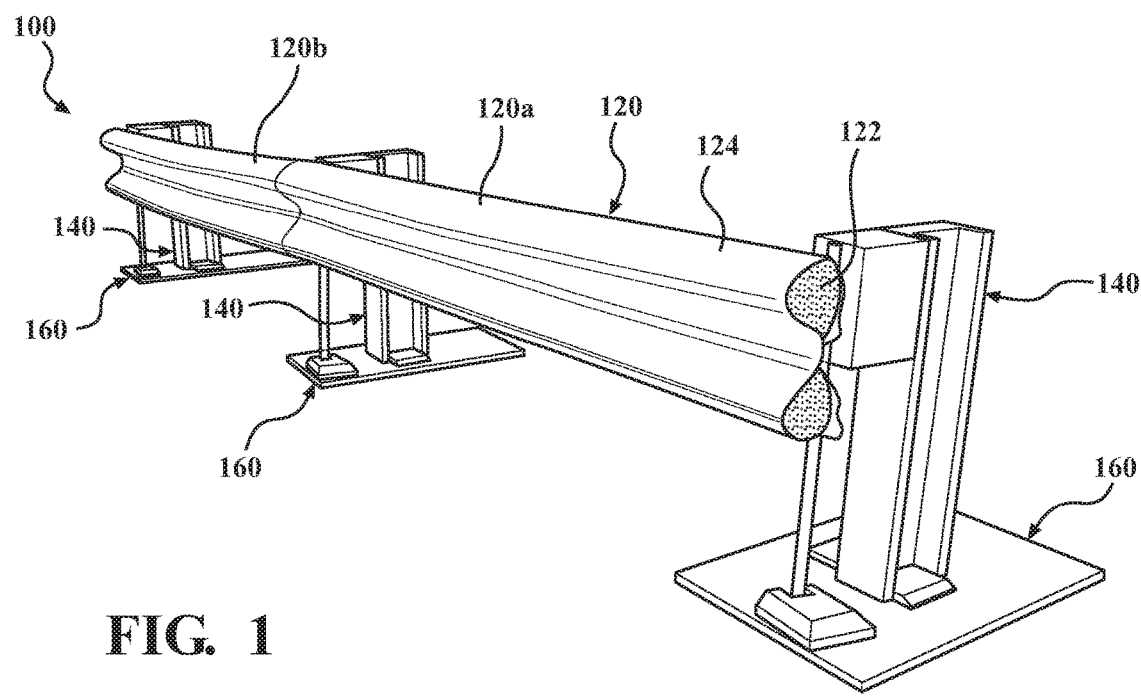
FIG. 1 is a view of an example of a guardrail surrogate.
Figure 2:
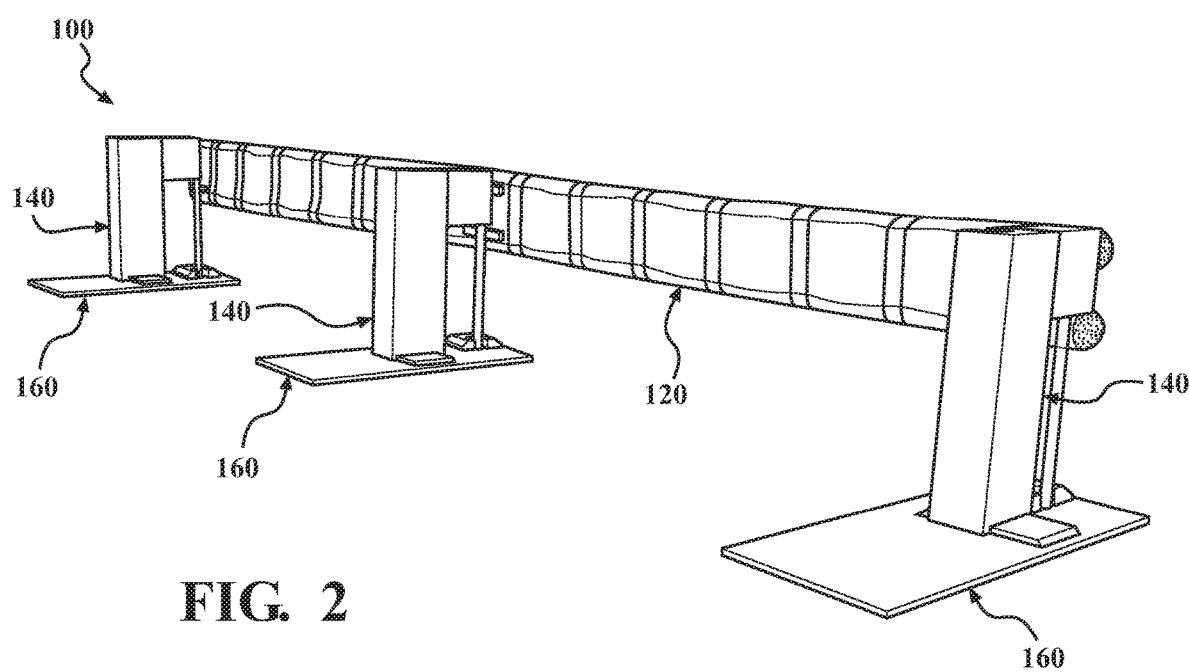
FIG. 2 is another view of the guardrail surrogate of FIG. 1.

According to arrangements herein, surrogates are provided for one or more roadside objects, such as a guardrail. These surrogates can approximate the overall visual appearance of the corresponding roadside object, and they can mimic the characteristics of the corresponding roadside object relative to vehicle sensors. These surrogates can be used in the testing of vehicles, such as autonomous vehicles and/or vehicles with a road departure mitigation system.

The surrogates can be relatively lightweight, soft, and sturdy. The surrogates can be configured to be crashed into by a vehicle without damaging the test vehicle. The surrogates can also be configured to be crashed into by a vehicle without damaging the surrogate in many cases. However, it will be appreciated that, in at least some instances, damage to the surrogate may occur if it is repeatedly crashed into by a vehicle (assuming it is not rolled over by the vehicle) and/or if it is crashed into by a vehicle at high speeds. The surrogates can have substantially the same size and/or shape as the roadside objects that they are being used as a substitute. At least a portion of the surrogates can be configured to separate after being impacted by a vehicle. The surrogates can be configured to be reset for use within a period of time, such as 2 minutes or less per meter of the length of the surrogate.

The surrogates can be configured to exhibit substantially the same characteristics to one or more vehicle sensors (e.g., cameras, radar sensors, LIDAR sensors, etc.) as their corresponding roadside object. For example, the surrogates can have substantially the same visual appearance (e.g., color, size, and shape) as the corresponding roadside object. In this respect, the surrogate can appear substantially same to vehicle cameras as the actual corresponding roadside object. Further, the surrogates can exhibit substantially the same radar reflectivity and/or radar cross-section as the corresponding roadside object. In one or more arrangements, the surrogates can exhibit substantially the same radar cross-section for 24 GHz radar and/or for 77 GHz radar as the corresponding roadside object. In one or more arrangements, for a metal guardrail surrogate, the radar reflectivity of a skin of the surrogates can be 0±1 dB for both 24 GHz and 77 GHz radar. Thus, the surrogate can appear substantially the same to a radar sensor as the corresponding roadside object. Still further, the surrogates can exhibit substantially the same infrared reflectivity as the corresponding roadside object. More particularly, the surrogates can exhibit substantially the same infrared reflectivity as the corresponding roadside object at a reflectance angle of from substantially 20 degrees to substantially 70 degrees (where 0 degree is the direction normal to the object surface). The surrogate can appear substantially the same to a LIDAR sensor as the corresponding roadside object.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-7, but the embodiments are not limited to the illustrated structure(s) or application(s).

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. In addition, numerous specific details are set forth in order to provide a thorough understanding of the embodiments described herein. However, it will be understood by those of ordinary skill in the art that the embodiments described herein can be practiced without these specific details.

As used herein, the terms "substantially" and "about" includes exactly the term they modify and slight variations therefrom. Thus, the term "substantially vertically" means exactly vertically and slight variations therefrom. Slight variations therefrom can include being within 15 degrees/units or less, 10 degrees/units or less, 9 degrees/units or less, 8 degrees/units or less, 7 degrees/units or less, 6 degrees/units or less, 5 degrees/units or less, 4 degrees/units or less, 3 degrees/units or less, 2 degrees/units or less, 1 degree/unit or less. Slight variations therefrom can include being within normal manufacturing tolerances.

One example of a roadside object in which arrangements described herein can be used is a guardrail. Guardrails are relatively abundant on roads throughout the United States and in other countries. Guardrails can have various uses, such as to prevent a vehicle from leaving a road, straying into a dangerous or off-limits areas, and/or colliding with roadside obstacles. Guardrails can be made of one or more metals, such as galvanized steel.

In one or more arrangements, a surrogate for a guardrail can be provided. Examples of a guardrail surrogate 100 is shown in FIGS. 1-6. The guardrail surrogate 100 can have substantially the same size, shape, and/or configuration as any guardrail, now known or later developed. The guardrail surrogate 100 can have a main body 120 and a plurality of posts 140. The guardrail surrogate 100 can have one or more base elements 160. Each of these various components of the guardrail surrogate 100 will be discussed in turn below.

The main body 120 can have substantially the same size, shape, and/or configuration as a main body portion of any guardrail, now known or later developed. In one or more arrangements, the main body 120 can be a single continuous piece. In one or more arrangements, the main body 120 can be formed by a plurality of shorter main body segments. FIG. 1 shows an example in which the main body 120 is made of two main body segments 120a, 120b. The plurality of shorter main body segments can be arranged in an end to end manner, as is shown in FIG. 1, to collectively form the main body 120 of the guardrail surrogate 100. The main body segments can be operatively connected to each other in any suitable manner, including, for example, one or more adhesives, one or more forms of mechanical engagement, and/or one or more fasteners. The main body segments can be substantially identical to each other. Alternatively, the main body segments can be different from each other in one or more respects.

The main body 120 can have any suitable cross-sectional shape. In one or more arrangements, the main body 120 can have a W-beam cross-sectional shape. One standard width for a W-beam cross-sectional shaped guardrail is about 12.25 inches, and one standard depth for a W-beam cross-sectional shaped guardrail is about 3.25 inches. However, it will be understood that the main body 120 can have other cross-sectional shapes corresponding to the cross-sectional shapes of actual guardrails.

In one or more arrangements, the main body 120 can include a core 122 and a skin 124. The core 122 can define the overall shape of the guardrail surrogate 100. The core 122 can be made of a relatively soft, sturdy, and/or lightweight material. For instance, the core 122 can be made of a foam material. As an example, the core 122 can be made of polyethylene foam. As an example, the core can be made of 1.8 $lb/ft^3$ polyethylene foam. As another example, the core 122 can be made of 2 $lb/ft^3$ cross-linked polyethylene foam. In one or more arrangements, the core 122 can be made of a non-metal material.

In one or more arrangements, at least a portion of the core 122 can be painted. The paint can be any suitable type of paint. For instance, the paint can be an acrylic paint. The paint can minimize damage to the core 122 (e.g., foam) due to sun exposure.

At least a portion of the core 122 can be substantially covered by the skin 124. The skin 124 can protect the underlying core 122. The skin 124 can be configured to cause the guardrail surrogate 100 to satisfy the requirements of one or more vehicle sensors. For instance, the skin 124 can be configured to satisfy requirements for LIDAR sensors, radar sensors, and/or cameras of a vehicle.

In one or more arrangements, the skin 124 can be made of a single layer. In one or more arrangements, the skin 124 can include a plurality of layers. For instance, in one or more arrangements, an outermost layer of the plurality of layers of the skin 124 can be configured to satisfy the requirements for one or more types of vehicle sensors. As an example, the skin 124 can include an outermost layer for satisfying the requirements for vehicle cameras and/or vehicle LIDAR sensors. The outermost layer of the skin 124 and one or more intermediate layers between the outermost layer and the core 122 can collectively satisfy the requirements for vehicle radar sensors. In some arrangements, there can be one or more intermediate layers between the outermost layer and the core 122. The skin 124 can also serve as a protective layer to the core 122, such as when the guardrail surrogate 100 is crashed into by a vehicle during testing.

In one or more arrangements, one or more layers of the skin 124 can be made of a film. The film can be made of any suitable material. For instance, in one or more arrangements, one or more layers of the skin 124 can be made of a polycarbonate film. More particularly, one or more layers of the skin 124 can be made of a matte polycarbonate film. That is, at least one of the sides of the polycarbonate film can have a matte finish. In one or more arrangements, both sides of the polycarbonate film can have a matte finish. In one or more arrangements, one of the sides of the polycarbonate film can have a matte finish, and the other one of the sides of the polycarbonate film can have a clear finish. The polycarbonate film can have any suitable thickness. For instance, the polycarbonate film can have a thickness from about 0.01 inches to about 0.1 inches. In one or more arrangements, the polycarbonate film can define an outermost layer of the skin 124. It will be appreciated that polycarbonate film is merely one example of a film. One or more layers of the skin 124 can be made of other suitable films.

In one or more arrangements, one or more of the layers of the skin 124 can include zinc. For instance, one or more of the layers of the skin 124 can be defined by a zinc coating. The zinc layer can be very thin. The zinc layer can have a substantially uniform thickness. In one or more arrangements, the zinc can be directly applied on an inner-facing side of the polycarbonate film. In one or more arrangements, the zinc layer of the skin 124 can be defined by zinc nanoparticles, which can be bonded to a surface of one of the layers of the skin 124. In one or more arrangements, the zinc layer can be defined by zinc paint.

Various examples of the skin 124 will now be provided. In one or more arrangements, one or more layers of the skin 124 can be made of a fabric material. In one or more arrangements, one or more layers of the skin 124 can be made of a conductive paint. For instance, the fabric material can be a conductive fabric, such as a nickel copper fabric or a copper fabric. In one or more arrangements, the skin 124 can include a zinc coating on a conductive fabric. In one or more arrangements, the skin 124 can include a zinc coating on a non-conductive fabric. In one or more arrangements, the skin 124 can include nano-sized zinc particles bonded to a fabric (e.g., a polyester fabric). In one or more arrangements, the skin 124 can include zinc coat on one side of an about 0.01 inch thick clear-clear polycarbonate sheet. In one or more arrangements, the skin 124 can include a zinc coating on one side of an about 0.01 inch thick matte-clear polycarbonate sheet. In one or more arrangements, the skin 124 can include an aluminum layer (e.g., aluminum film or aluminum tape) on one side of 0.01 inch thick matte-matte polycarbonate sheet. In one or more arrangements, the skin 124 can include a matte-matte polycarbonate film with a thin zinc layer on one side and an aluminum layer (e.g., film or tape) on top of the zinc layer. In such case, the polycarbonate film can define the outermost layer of the skin 124, and the aluminum layer can define the innermost layer of the skin 124.

In one or more arrangements, the skin 124 can include a zinc coating on foam. In one or more arrangements, the skin 124 can include a zinc coating on fabric. In one or more arrangements, the skin 124 can include clear polycarbonate film, copper fabric, and a zinc coating. In one or more arrangements, the skin 124 can include clear polycarbonate film, a zinc coat, and aluminum film. In one or more arrangements, the skin 124 can include matte polycarbonate film, a zinc coat, and aluminum film. In one or more arrangements, the skin 124 can include matte polycarbonate film glued with aluminum film.

The skin 124 can be attached to the core 122 in any suitable manner. For instance, the skin 124 can be attached to the core 122 by one or more adhesives. In one or more arrangements, the skin 124 can be attached to the core 122 using Velcro. In one or more arrangements, the skin 124 can be attached to the core 122 using duct tape. In one or more arrangements, the skin 124 can be attached to the core 122 using glue.

As noted above, the guardrail surrogate 100 can include one or more posts 140. The post(s) 140 can have substantially the same size, shape, and/or configuration as the posts of any guardrail, now known or later developed. The post(s) 140 can have any suitable cross sectional shape. In one or more arrangements, the post(s) 140 can have a substantially I-beam cross-sectional shape. In one or more arrangements, the post(s) can have a substantially C-shaped cross-sectional shape. However, it will be understood that the post(s) 140 can have other cross-sectional shapes. The post(s) can help in support the main body 120 at an elevational position above a surface (e.g., the ground, a road, a shoulder of a road, etc.) and/or can provide structural support for the guardrail surrogate 100.

The outer surfaces of the post(s) 140 can be smooth and flat. In arrangements in which the post(s) 140 have a substantially I-beam cross-sectional shape, the corners should be at substantially 90 degrees.

The post(s) 140 can include a core and a skin. For example, the above description of the core 122 and the skin 124 of the main body 120 applies equally to the core and the skin of the post(s) 140. The core and skin of the post(s) 140 can be the same as the core 122 and the skin 124 of the main body 120, or they can be different.

When the guardrail surrogate 100 includes a plurality of posts 140, the posts 140 can be substantially identical to each other. Alternatively, one or more posts 140 can be different from the other posts 140 in one or more respects.

When the guardrail surrogate 100 is in an operational position, the post(s) 140 can extend in a substantially vertical direction. The main body 120 can be operatively connected to the post(s) such that the main body 120 extends in a substantially horizontal direction when the guardrail surrogate 100 is in an operational position. The term "operatively connected," as used throughout this description, can include direct or indirect connections, including connections without direct physical contact. Further, the main body 120 can be located on the post(s) such that, when the guardrail surrogate 100 is in an operational position, the main body 120 is located at an elevation corresponding to the elevation at which the main body of any guardrail, now known or later developed, is held.

The main body 120 can be operatively connected to the post(s) 140 in any suitable manner, such as by one or more fasteners, one or more adhesives, one or more forms of tape, one or more hook and loop type connectors (e.g., Velcro), one or more forms of frictional engagement, and/or one or more forms of mechanical engagement, just to name a few possibilities. The attachment between the main body and the one or more posts can be configured to be readily separable. Thus, for example, if the guardrail surrogate 100 is impacted by a vehicle, the main body 120 and the post(s) 140 can easily separate from each other, thereby minimizing damage to the guardrail surrogate 100 and to the vehicle.

The guardrail surrogate 100 can include one or more base elements 160. The base element(s) 160 can help to support and/or stabilize the guardrail surrogate 100 on a surface (e.g., the ground). In some instances, the base element(s) 160 can facilitate a connection between the main body 120 and the post(s) 140. In one or more arrangements, the base element(s) 160 can be painted in a color that matches the surrounding environment, such as green or brown. Doing so can mimic the contrast between the color of the post(s) 140 and the ground.

In one or more arrangements, each post 140 can be associated with a base element 160. However, in some instances, one or more of the posts 140 may not be associated with a base element 160. The base element(s) 160 can have any suitable configuration.

Figure 3:
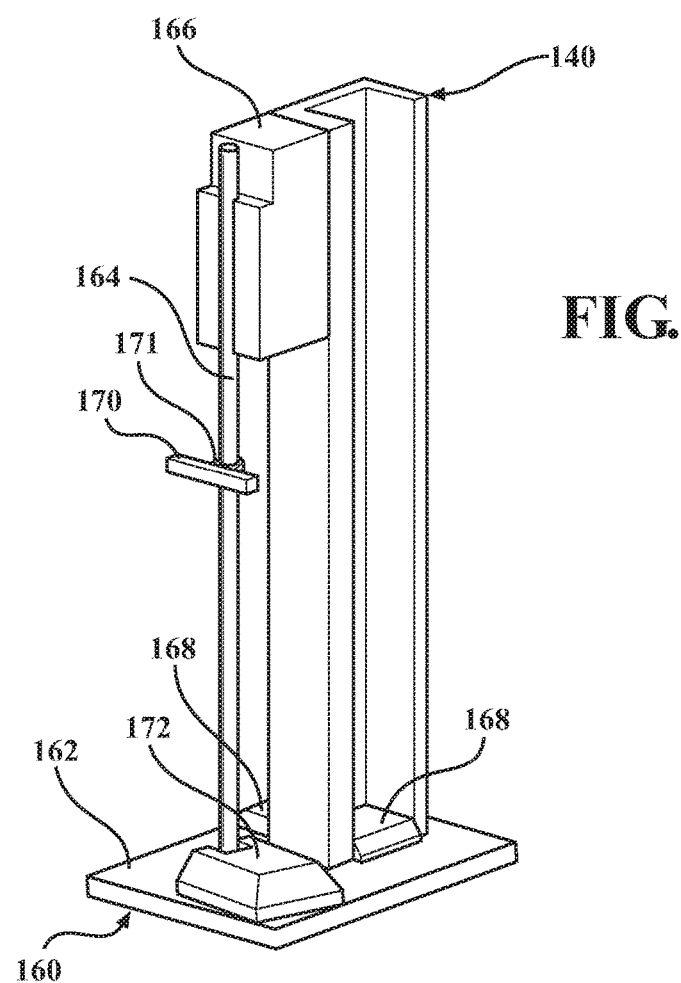
FIG. 3 is a view of an example of a post and base element for the guardrail surrogate.
Figure 4:
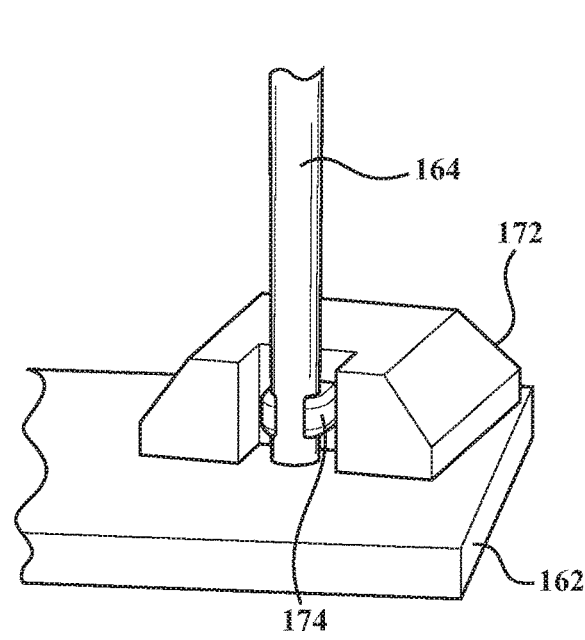
FIG. 4 is a view of a portion of a post and a base element of the guardrail surrogate.
Figure 5:
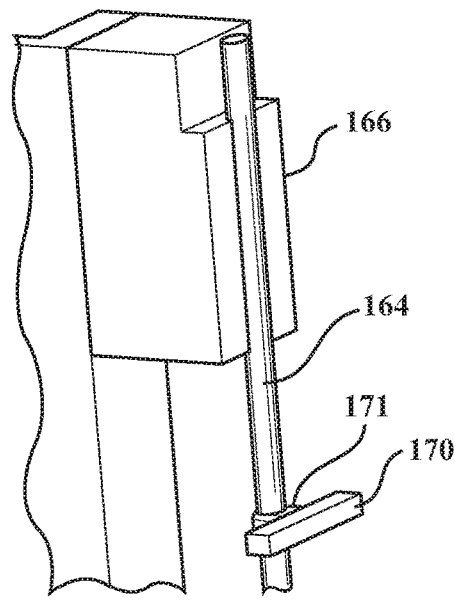
FIG. 5 is a view of a portion of a post and a base element of the guardrail surrogate.

One example of the base element(s) 160 is shown in FIGS. 3-5. The base element(s) 160 can include a base 162, a tube 164, a tube holder 166, a post holder 168, and a main body holder 170. The tube holder 166 can hold the tube 164 in any suitable manner, such as by one or more forms of mechanical engagement, one or more fasteners, and/or one or more adhesives. The tube holder 166 can engage an upper region of the tube 164. The main body holder 170 can be configured to engage the tube 164, such as in a middle region of the tube 164. The main body holder 170 can engage the tube 164 in any suitable manner, such as by one or more forms of mechanical engagement, one or more fasteners (e.g., clamp 171), and/or one or more adhesives. The base element(s) 160 can include a tube holder 172. The tube holder 172 can be configured to engage a lower region of the tube 164. The tube holder 172 can hold the tube 164 in any suitable manner, such as by one or more forms of mechanical engagement, one or more fasteners (e.g., clamp 174), and/or one or more adhesives. The main body holder 170 can be operatively connected to the main body 120 in any suitable manner, such as by one or more fasteners, one or more adhesives, one or more forms of tape, one or more hook and loop type connectors (e.g., Velcro), one or more forms of frictional engagement, and/or one or more forms of mechanical engagement.

The base 162 can be a made of any suitable material. In one or more arrangements, the base 162 can be made of wood. The base 162 can have any suitable size, shape, and/or configuration. In one or more arrangements, the base 162 can have dimensions of 12 inches×20 inches×0.75 inches. The tube 164 can extend in a substantially vertical direction from the base 162. The tube 164 can be hollow or non-hollow. The tube 164 can have any suitable cross-sectional shape. For example, the tube 164 can be substantially circular in cross-sectional shape. The tube 164 can be made of any suitable material. For instance, the tube 164 can be made of polycarbonate.

When the guardrail surrogate 100 includes a plurality of base elements 160, the base elements 160 can be substantially identical to each other. Alternatively, one or more base elements 160 can be different from the other base elements 160 in one or more respects.

Figure 6:
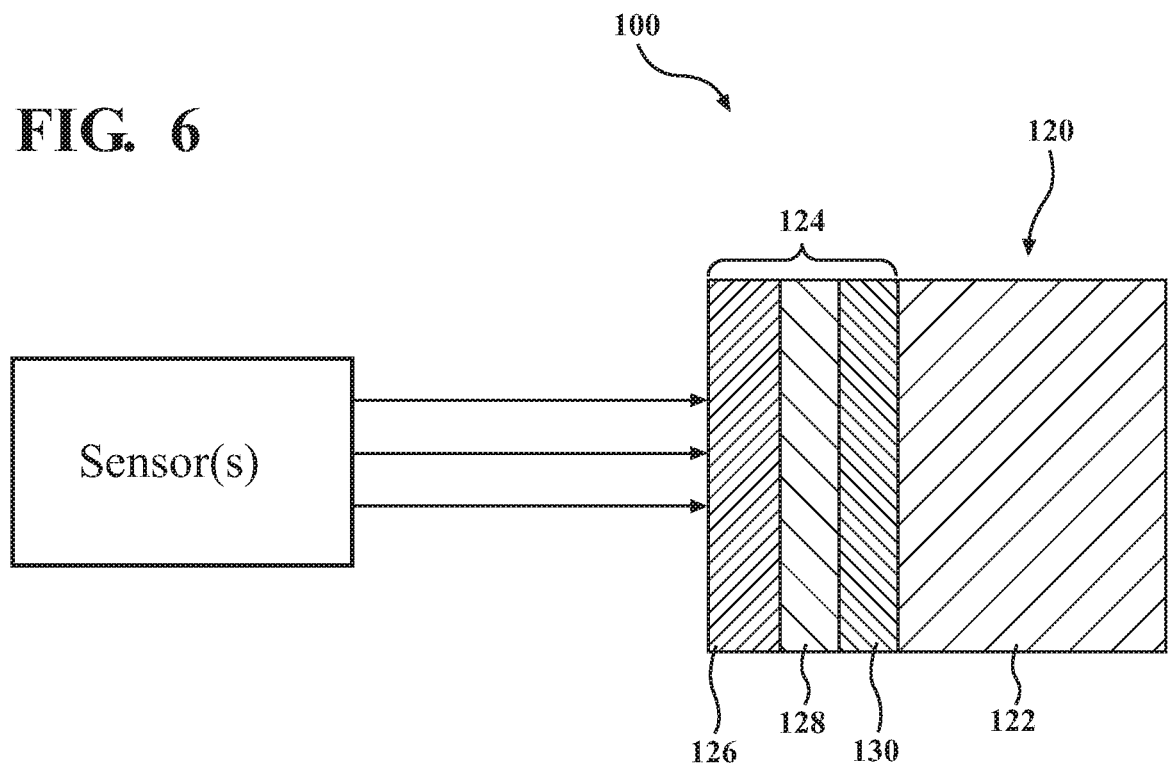
FIG. 6 is a cross-sectional view of a portion of a main body of a guardrail surrogate, showing a core and a multi-layer skin.
Figure 7A:
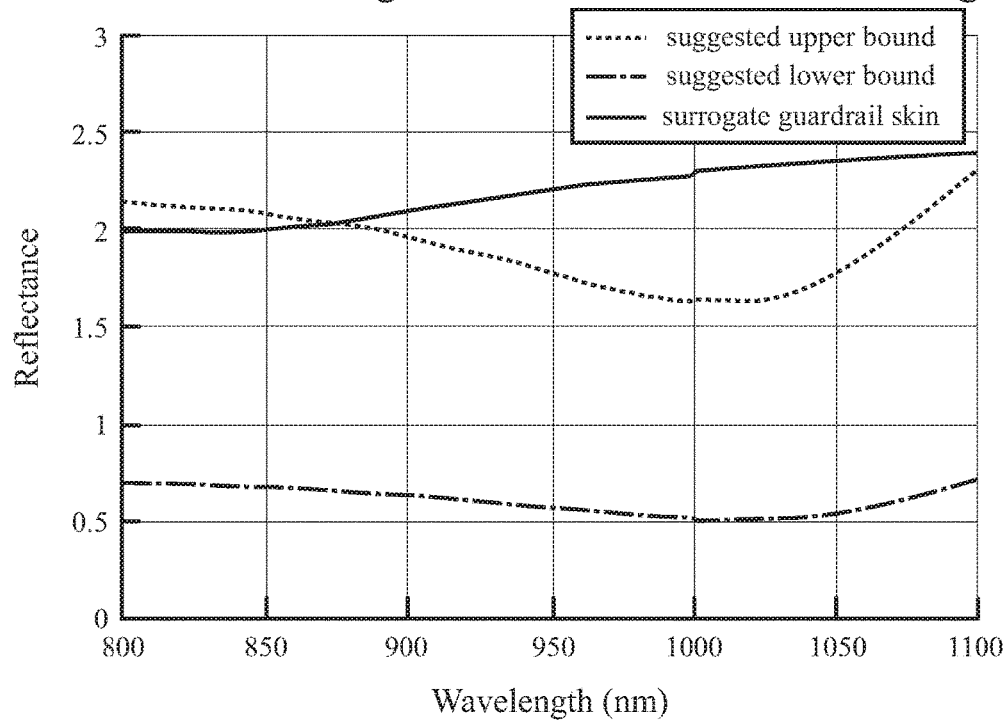
FIGS. 7A-7H show infrared reflectance test results of a guardrail surrogate at various detection angles.
Figure 7B:
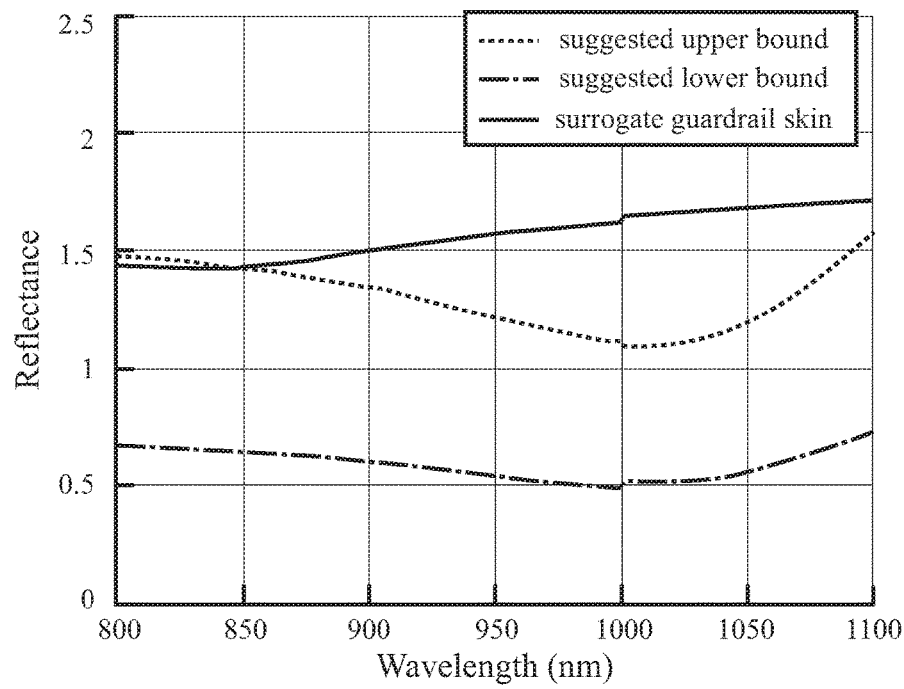
Figure 7C:
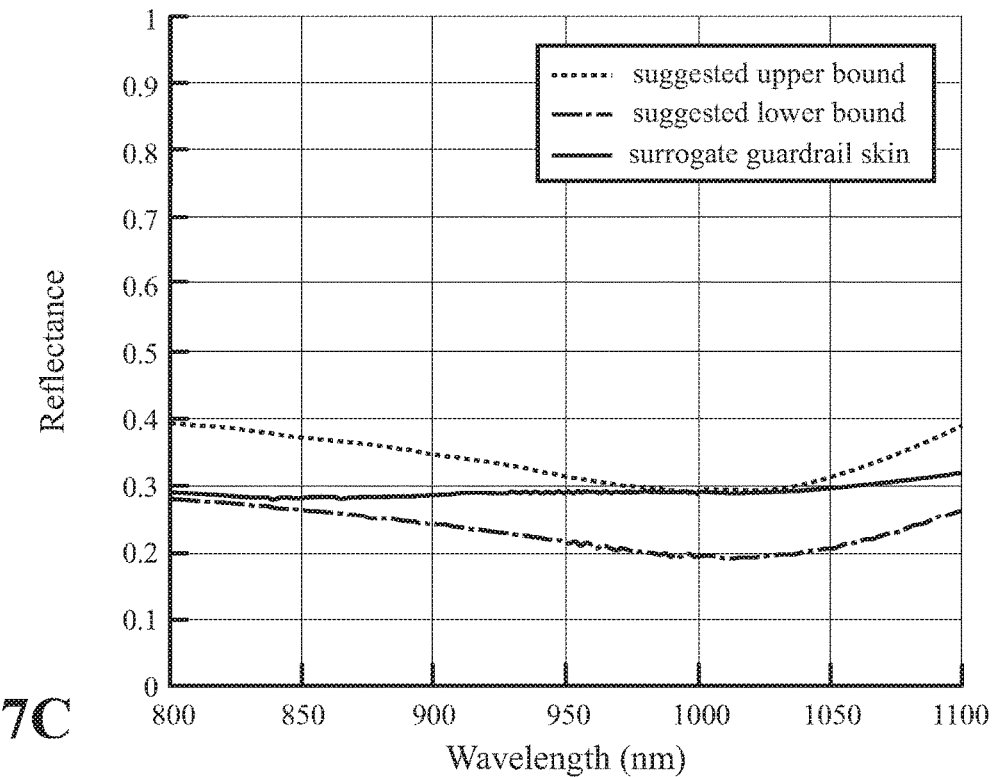
Figure 7D:
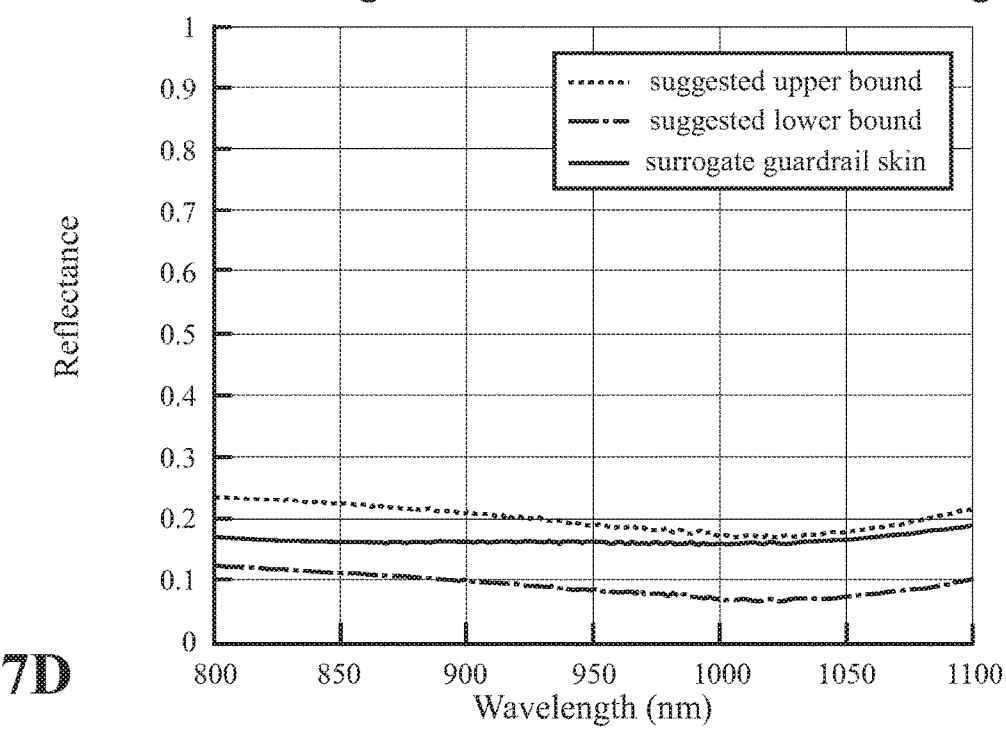
Figure 7E:
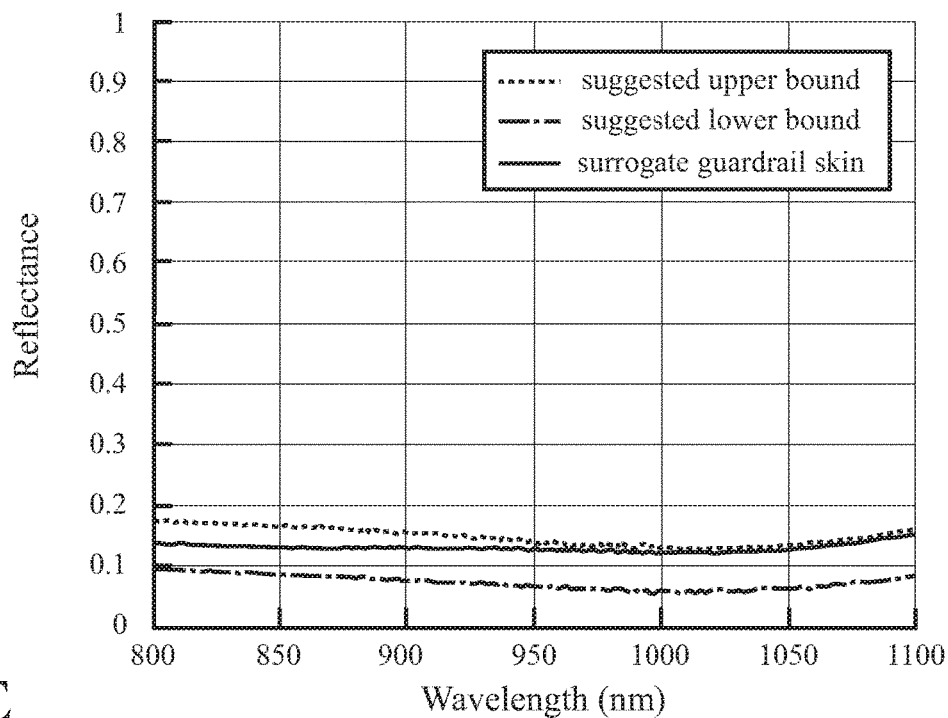
Figure 7F:
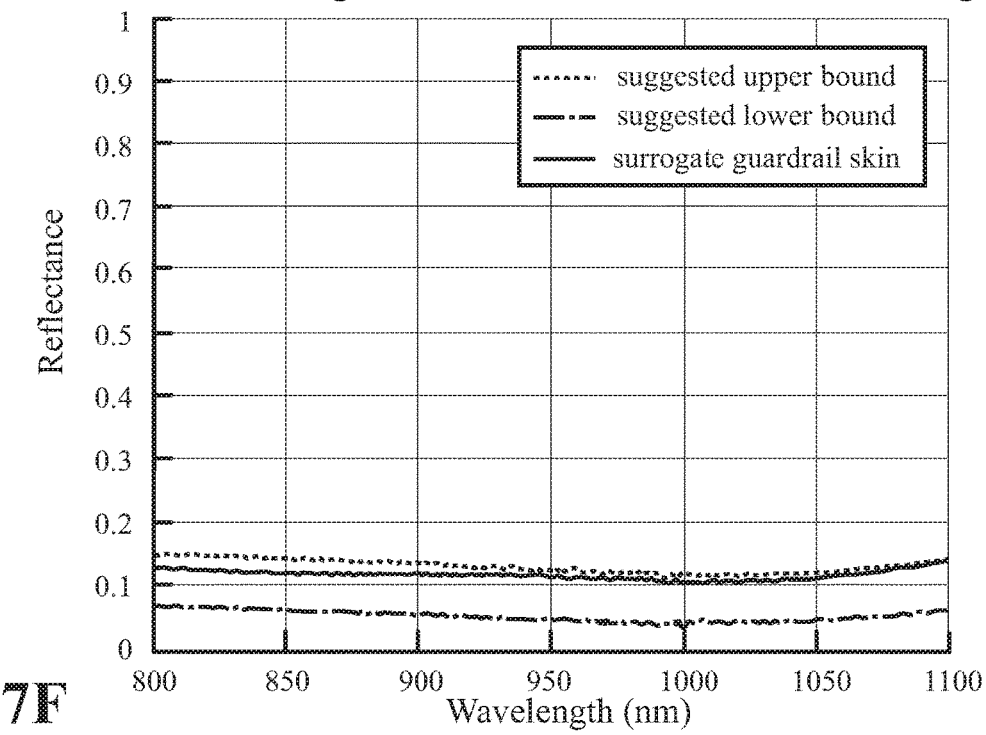
Figure 7G:
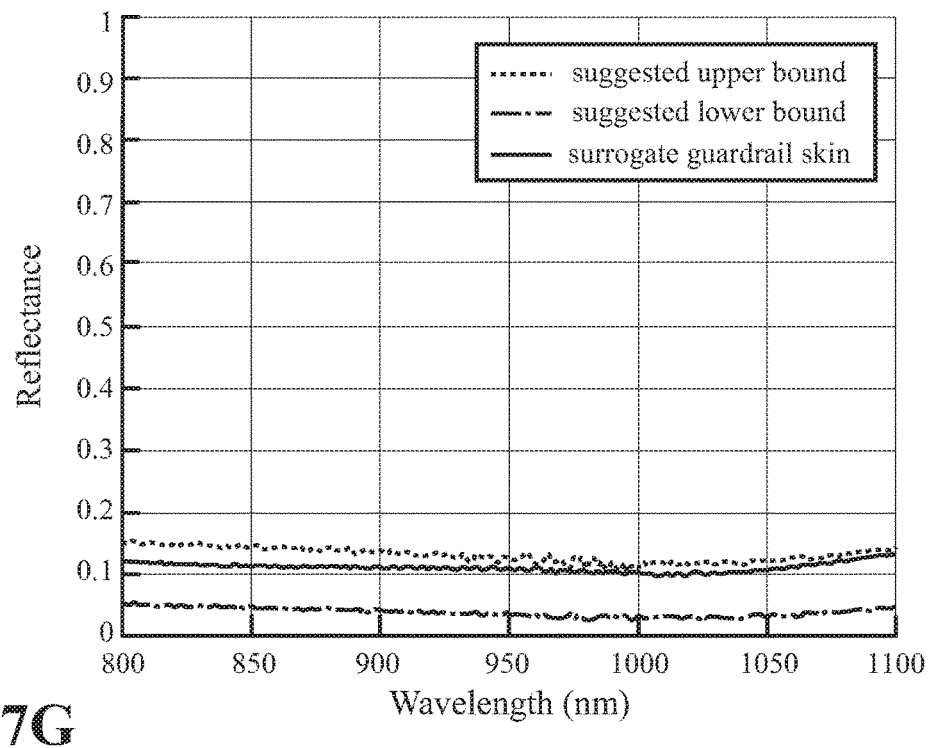
Figure 7H:
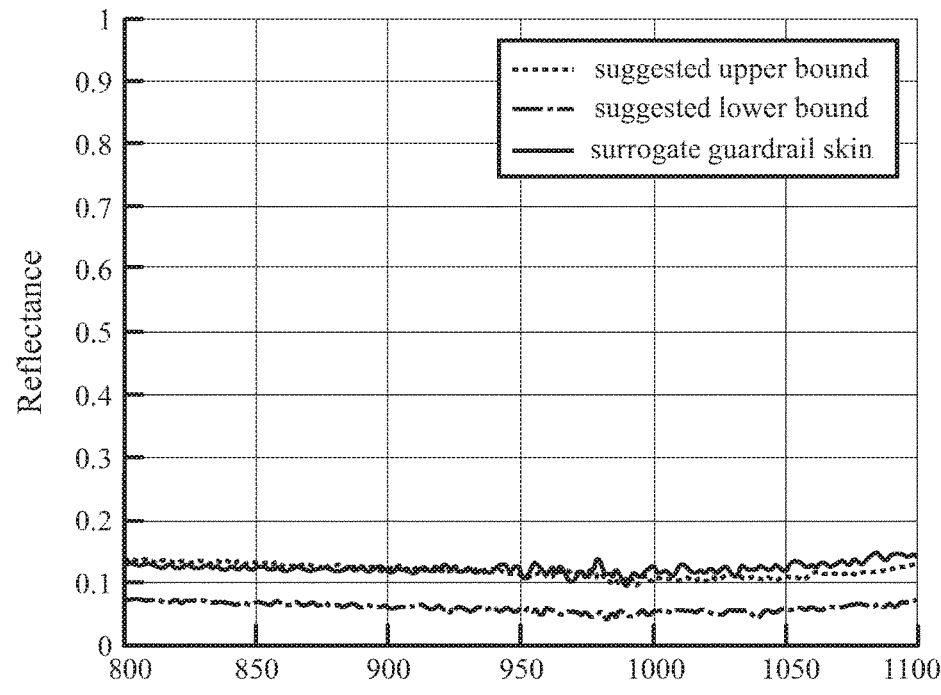

One example of a cross-sectional view of the main body 120 of the guardrail surrogate 100 is shown in FIG. 6. In this example, the core 122 of the main body 120 can be made of polyethylene foam, and the skin 124 can have three layers. An outermost layer 126 can be made of a 0.01 inch thick matte-matte polycarbonate film. An intermediate layer 128 can include zinc, such as a zinc coating. An innermost layer 130 can include aluminum, such as aluminum film. The terms "outermost" and "innermost" are used for convenience relative to the core 122 of the main body 120. In addition to the main body 120, the above example materials for the core 122 and the skin 124 can be used in connection with the post(s) 140 as well. Test data showed that the guardrail surrogate 100 met camera requirements, radar cross section (RCS) requirements (e.g., 0±1 dB for both 24 GHz and 77 GHz radar). Test data also showed that the guardrail surrogate 100 also met infrared requirements in the detection angle range of 20 to 70 degrees, as is shown in FIGS. 7A-7H.

While a guardrail surrogate has been described above, it will be understood that the approaches described herein can generally be applied to create surrogates for other roadside objects, such as curbs, poles, tree trunks.

The surrogates described herein can be used for various purposes. For instance, the surrogates can be used in connection with the testing of vehicles. The vehicle can have a sensor system. The sensor system can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors, the sensors can work independently from each other. Alternatively, two or more of the sensors can work in combination with each other. In such case, the two or more sensors can form a sensor network. The sensor system and/or the one or more sensors can be operatively connected to processor(s), the data store(s), and/or other elements or systems of the vehicle. The sensor system can acquire data of at least a portion of the external environment of the vehicle.

The sensor system can include one or more environment sensors 123 configured to acquire, detect, determine, assess, monitor, measure, quantify and/or sense driving environment data. "Driving environment data" includes and data or information about the external environment in which a vehicle is located or one or more portions thereof. For example, the one or more environment sensors can acquire data or information about obstacles in at least a portion of the external environment of the vehicle. In one or more arrangements, the sensor system can include one or more radar sensors, one or more LIDAR sensors, and/or one or more cameras.

The surrogates can be used on a test track or testing facility. The surrogates can be set up in an appropriate position with respect to the road. It should be noted that the guardrail surrogate be used on one or both sides of a road. Guardrails surrogates used on one side of the road can be substantially identical to guardrail surrogates used on the other side of the road, or they can be substantially mirror images of each other.

The vehicle can move along the test track and the sensor system can acquire driving environment data, including data about the guardrail surrogate, using the camera(s), the radar sensor(s), and the LIDAR sensor(s). Due to the construction of the guardrail surrogate, the data of the guardrail surrogate acquired by the sensor system can mimic the sensor data that would be acquired by the sensor system in a real world driving environment. The vehicle can process the sensor data to determine an appropriate action. However, if for some reason, the vehicle does not detect the guardrail surrogate and the vehicle collides with the guardrail surrogate, at least some of the individual components of the guardrail surrogate may separate. However, due to the construction of the guardrail surrogate, damage to the vehicle and the guardrail surrogate is avoided. The guardrail surrogate can be readily set up again and further testing can be performed.

As an example, the surrogates described herein can be used in connection with the testing of the sensors and/or systems of an autonomous vehicle. "Autonomous vehicle" means a vehicle that configured to operate in an autonomous operational mode in which one or more computing systems are used to navigate and/or maneuver the vehicle along a travel route with minimal or no input from a human driver. In one or more arrangements, the autonomous vehicle can be highly automated or completely automated. As another example, the surrogates described herein can be used to road departure mitigation systems of non-autonomous vehicles.

It will be appreciated that arrangements described herein can provide numerous benefits, including one or more of the benefits mentioned herein. For example, arrangements described herein can provide surrogates that appear to be visually realistic to their counterpart roadside objects. Arrangements described herein can provide surrogates that mimic their corresponding roadside object with respect to one or more sensors. Arrangements described here enable the surrogates to be used in vehicle testing, particularly the testing of road departure systems. Arrangements described herein can be crashed into during testing, thereby avoiding damage to the surrogates and to the test vehicle. Arrangements described herein can be used for internal testing and to support upcoming European New Car Assessment Programme (EUNCAP) requirements for road departure systems and potential future National Highway Traffic Safety Administration (NHTSA)/Insurance Institute for Highway Safety (IIHS) requirements.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible.

What is claimed is:

1. A metal guardrail surrogate comprising:
a main body, the main body being substantially the same size and shape as a main body of a metal guardrail, the main body including a core and a skin attached to the core, the skin covering at least a portion of the core
the skin including a plurality of layers, the plurality of layers including a first layer, a second layer, and an intermediate layer, the intermediate layer being located between the first layer and the second layer, and wherein the plurality of layers includes at least two of:
one of the plurality of layers including polycarbonate;
one of the plurality of layers including zinc; and
one of the plurality of layers including aluminum.

2. The metal guardrail surrogate of claim 1, wherein the main body is made of a plurality of main body segments, and wherein the main body segments are operatively connected in an end to end manner.

3. The metal guardrail surrogate of claim 1, wherein the core is made of a foam material.

4. The metal guardrail surrogate of claim 1, wherein an outermost layer of the plurality of layers is configured to exhibit substantially the same characteristics as a metal guardrail relative to a camera or a LIDAR sensor.

5. The metal guardrail surrogate of claim 1, wherein the plurality of layers is configured to collectively exhibit substantially the same characteristics as a metal guardrail relative to a RADAR sensor.

6. The metal guardrail surrogate of claim 1, wherein the first layer includes a polycarbonate film.

7. The metal guardrail surrogate of claim 6, wherein the first layer defines an outermost layer of the plurality of layers.

8. The metal guardrail surrogate of claim 1, wherein the intermediate layer includes zinc.

9. The metal guardrail surrogate of claim 1, wherein the second layer defines an innermost layer of the plurality of layers, and wherein the second layer includes aluminum.

10. The metal guardrail surrogate of claim 1, further including one or more posts operatively connected to the main body, whereby the one or more posts support the main body at an elevational position above a surface.

11. The metal guardrail surrogate of claim 10, wherein the one or more posts include a core and a skin attached to the core, the skin covering at least a portion of the core.

12. A metal guardrail surrogate comprising:
a main body, the main body including a core and a skin attached to the core, the skin covering at least a portion of the core, the skin including a plurality of layers, the plurality of layers including a first layer, a second layer, and an intermediate layer, the intermediate layer being located between the first layer and the second layer, and wherein the plurality of layers includes at least two of:
one of the plurality of layers including polycarbonate;
one of the plurality of layers including zinc; and
one of the plurality of layers including aluminum;
one or more posts operatively connected to the main body, whereby the one or more posts support the main body at an elevational position above a surface; and
one or more base elements operatively connected to the posts, whereby the one or more posts stabilize the metal guardrail surrogate on the surface, the main body, the one or more posts, and the one or more base elements being separable from each other.

13. The metal guardrail surrogate of claim 12, wherein the first layer includes a polycarbonate film, and wherein the intermediate layer includes zinc.

14. The metal guardrail surrogate of claim 13, wherein the second layer defines an innermost layer of the skin, and wherein the first layer defines an outermost layer of the skin.

15. The metal guardrail surrogate of claim 14, wherein the second layer includes aluminum.

16. The metal guardrail surrogate of claim 12, wherein the main body is made of a plurality of main body segments, and wherein the main body segments are operatively connected in an end to end manner.

17. The metal guardrail surrogate of claim 12, wherein the skin is configured to exhibit substantially the same radar cross-section as a main body of a metal guardrail for at least one of 24 GHz radar or for 77 GHz radar.

18. The metal guardrail surrogate of claim 12, wherein the skin is configured to exhibit substantially the same infrared reflectivity as a main body of a metal guardrail at a reflectance angle of from substantially 20 degrees to substantially 70 degrees.

19. A surrogate for a roadside object for use in vehicle testing, the surrogate comprising:
a body configured to be substantially the same size and shape as a body of a roadside object, the body including a core and a skin attached to the core, the skin covering at least a portion of the core,
the core including a foam material, and
the skin including at least three layers, wherein at least two of:
one of the at least three layers including polycarbonate;
one of the at least three layers including zinc; and
one of the at least three layers including aluminum.

20. The surrogate of claim 19, wherein an outermost layer of the at least three layers includes polycarbonate, wherein an innermost layer of the at least three layers includes aluminum, and wherein an intermediate layer of the at least three layers includes zinc.

\* \* \* \* \*

UNITED STATES PATENT AND TRADEMARK OFFICE
CERTIFICATE OF CORRECTION

PATENT NO. : 10,689,818 B2
APPLICATION NO. : 16/144256
DATED : June 23, 2020
INVENTOR(S) : Rini Sherony et al.

Page 1 of 1

It is certified that error appears in the above-identified patent and that said Letters Patent is hereby corrected as shown below:

In the Claims

Claim 1, Column 9, Line 38: delete "a portion of the core" and insert --a portion of the core,--

Signed and Sealed this
Twenty-first Day of July, 2020

Andrei Iancu
*Director of the United States Patent and Trademark Office*